US012078296B2

(12) United States Patent
Stahl

(10) Patent No.: US 12,078,296 B2
(45) Date of Patent: Sep. 3, 2024

(54) PRESSURIZED-CONTAINER ARRANGEMENT

(71) Applicant: Bayerische Motoren Werke Aktiengesellschaft, Munich (DE)

(72) Inventor: Hans-Ulrich Stahl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 213 days.

(21) Appl. No.: 17/630,057

(22) PCT Filed: Jul. 14, 2020

(86) PCT No.: PCT/EP2020/069841
§ 371 (c)(1),
(2) Date: Jan. 25, 2022

(87) PCT Pub. No.: WO2021/018563
PCT Pub. Date: Feb. 4, 2021

(65) Prior Publication Data
US 2022/0275912 A1    Sep. 1, 2022

(30) Foreign Application Priority Data
Jul. 26, 2019  (DE) ..................... 10 2019 120 241.8

(51) Int. Cl.
*F17C 13/04*        (2006.01)

(52) U.S. Cl.
CPC ...... *F17C 13/04* (2013.01); *F17C 2201/0128* (2013.01); *F17C 2201/0138* (2013.01);
(Continued)

(58) Field of Classification Search
CPC .............. F17C 13/04; F17C 2201/0128; F17C 2201/0138; F17C 2203/0604;
(Continued)

(56) References Cited

U.S. PATENT DOCUMENTS 4,131,235 A * 12/1978 Lieding ................... F16K 17/20
239/570
5,413,140 A * 5/1995 Kimpel ................. F16K 3/0227
251/328
(Continued)

FOREIGN PATENT DOCUMENTS

CN    104085628 A    10/2014
CN    109416151 A    3/2019
(Continued)

OTHER PUBLICATIONS

PCT/EP2020/069841, International Search Report dated Oct. 23, 2020 (Two (2) pages).
(Continued)

*Primary Examiner* — Jessica Cahill
(74) *Attorney, Agent, or Firm* — Crowell & Moring LLP

(57) ABSTRACT

A pressure container arrangement includes a plurality of pressure containers, a number of safety valves, and a number of connection lines. The plurality of pressure containers are connected in fluid terms by the number of connection lines. At least one of the number of safety valves is disposed between a respective two of the plurality of pressure containers which are connected to each other. The number of safety valves are constructed to close from a predetermined maximum throughflow and/or from a predetermined maximum pressure difference.

9 Claims, 2 Drawing Sheets

(52) U.S. Cl.
CPC .............. *F17C 2203/0604* (2013.01); *F17C 2205/0138* (2013.01); *F17C 2205/0142* (2013.01); *F17C 2205/0332* (2013.01); *F17C 2221/012* (2013.01); *F17C 2223/0123* (2013.01); *F17C 2260/036* (2013.01); *F17C 2270/0178* (2013.01)

(58) Field of Classification Search
CPC ...... F17C 2205/0138; F17C 2205/0142; F17C 2205/0332; F17C 2221/012; F17C 2223/0123; F17C 2260/036; F17C 2270/0178; Y10T 137/86187
See application file for complete search history.

(56) References Cited

U.S. PATENT DOCUMENTS

| | | | | |
|---|---|---|---|---|
| 5,421,162 | A * | 6/1995 | Gustafson | F17C 9/02 |
| | | | | 62/7 |
| 5,676,180 | A * | 10/1997 | Teel | F17C 5/06 |
| | | | | 137/267 |
| 6,199,583 | B1 * | 3/2001 | Iacovella | F16K 17/205 |
| | | | | 137/513.3 |
| 6,412,484 | B1 | 7/2002 | Izuchukwu et al. | |
| 6,513,522 | B1 * | 2/2003 | Izuchukwu | A61M 16/0825 |
| | | | | 128/202.19 |
| 10,955,091 | B2 * | 3/2021 | Albert | F17C 13/04 |
| 11,519,554 | B2 * | 12/2022 | Allidieres | B63B 79/10 |
| 2004/0165731 | A1 * | 8/2004 | Ribic | H04R 25/558 |
| | | | | 381/317 |
| 2009/0293988 | A1 | 12/2009 | Pang et al. | |

FOREIGN PATENT DOCUMENTS

| | | |
|---|---|---|
| DE | 10 2012 104 141 A1 | 12/2012 |
| DE | 10 2017 117 151 A1 | 2/2018 |
| EP | 2 273 179 B1 | 1/2011 |
| WO | WO 2015/006761 A1 | 1/2015 |
| WO | WO 2017/096283 A1 | 6/2017 |
| WO | WO 2018/178173 A1 | 10/2018 |
| WO | WO 2018/183764 A1 | 10/2018 |

OTHER PUBLICATIONS

German Search Report issued in German application No. 10 2019 120 241.8 dated May 29, 2020, with Statement of Relevancy (Six (6) pages).

Chinese Office Action issued in Chinese application No. 202080052175.0 dated Nov. 3, 2022, with English translation (Thirteen (13) pages).

* cited by examiner a)

b)

PRESSURIZED-CONTAINER ARRANGEMENT

BACKGROUND AND SUMMARY OF THE INVENTION

The technology disclosed herein relates to a pressure container arrangement which can be used, for example, for storing pressurized fuel in a motor vehicle.

For future motor vehicles there is provision to increasingly use alternative fuels, such as, for example, pressurized hydrogen. The same applies to other gases which are stored under high pressure, in a liquefied state and/or cryogenically. In order to increase the range of such motor vehicles, it has been found to be advantageous for pressure containers which are used as tanks to be able to be adapted to provided structural spaces in the most ideal manner possible, that is to say, with few dead spaces, in order to use the structural space available for storing gaseous fuel. For example, corresponding structural spaces may be parallelepipedal and/or of limited height.

It has been found that corresponding structural spaces cannot be effectively used by conventional, large-volume spherical/cylindrical tanks. However, there is, for example, the concept of chain tanks or pipe stores which promise a better solution but involve problems which are specific to the structural type.

A preferred object of the technology disclosed herein is to provide a pressure container arrangement which is configured alternatively or better in this regard. Other preferred objectives may arise from the advantageous effects of the technology disclosed in this instance.

The technology disclosed in this instance relates to a pressure container arrangement. The pressure container arrangement has a plurality of pressure containers. It has a number of safety valves. It has a number of connection lines.

The pressure containers are connected in fluid terms by means of the connection lines. The safety valves are arranged between two pressure containers which are connected to each other in each case. The safety valves are constructed to close from a predetermined maximum throughflow and/or from a predetermined maximum pressure difference.

Using such a pressure container arrangement, it is possible, in the event of a possible leak of one of the pressure containers which, as a result of the problems described in the introduction, can more readily occur than with a pressure container arrangement having only one large pressure container, to limit the leak to such an extent that gas can escape only from one volume to adjacent safety valves. In the event of a leak, volume flows which are greater than the predetermined maximum throughflow during normal operation generally occur and/or pressure differences which are greater than the predetermined maximum pressure difference during normal operation occur. Normal operation is intended in this instance to be understood to include to the operating modes filling, storage and removal when there is no damage to the tank system. Accordingly, the respective safety valve, which adjoins a pressure container affected by a leakage, will ensure a closure and will consequently limit the quantity of gas being discharged. A higher level of safety can thereby be provided than if no safety valves were arranged between the pressure containers. At the same time, typical functionalities, such as filling the pressure container arrangement and removing gas for the purposes of operating a motor, a fuel cell or another energy converter, are in no way impaired since for this typically only throughflows below the predetermined maximum throughflow and/or pressure differences below the predetermined maximum pressure difference occur.

The pressure container arrangement may, for example, be in the form of a chain tank or a pipe store.

Chain tanks comprise, for example, a large number of small-volume chambers which are connected to each other in series and which themselves are, for example, substantially spherical/cylindrical. In the simplest case, the connection of the chambers is carried out by means of pipe bends made of the same material as the chambers themselves so that the liners and fiber reinforcement can be produced in each case using continuous production methods. However, the connections between individual chambers or pressure containers can also be produced using separate connection elements or connection lines in series and/or in parallel. Corresponding embodiments may be referred to as pipe stores and may also comprise small-volume spherical/cylindrical chambers.

The diameters of the chambers of chain tanks and pipe stores are typically considerably smaller than with conventional large-volume tanks. The overall surface of the chambers is in this instance considerably larger than with conventional large-volume tanks. If the chambers of chain tanks and pipe stores were to be produced with the same wall thickness as large-volume tanks were previously, this would result in an extremely increased and consequently uneconomical material complexity. However, the strength configuration of chambers with a smaller diameter, at the same output pressure, enables the wall thickness to be reduced in proportion to the diameter, which can be readily seen with reference to the vessel form. This enables an economical material use and the relative safety factor, for example, a burst factor of greater than 2.25, is maintained. However, it has been recognized that the absolute safety reserves are lower. If, for example, a container having a diameter of 300 mm has a tank wall of 21 mm, as a result of a burst factor >2.25, the outer half, that is to say, approximately 10.5 mm, can be damaged without a burst or a leak occurring at a nominal pressure of 70 MPa. However, if the container has a diameter of only 100 mm and a tank wall of 7 mm, it is obvious that a damage of 10.5 mm completely penetrates the tank wall.

It has been recognized that occurrences of damage which occur from the exterior on the container for chain tanks and pipe stores with a small diameter and smaller wall thickness are more critical than for conventional tanks having large diameters and a greater wall thickness. As a result of the technology described herein, however, it can be ensured that, in the case of damage or bursting of one of the pressure tanks or pressure containers, the effects thereof are minimized. It will be understood that relevant throughflows and pressure differences occur in each case at or above the respective safety valves.

According to an embodiment, the safety valves can be arranged in such a manner that at least one such safety valve is located in each connection between two pressure containers in each case. However, there may also be provision for such a safety valve not to be arranged between all the pressure containers which are connected to each other, wherein, for example, there may be provision for such a safety valve to be arranged only between each second, third or generally n-th pressure container(s) which are connected to each other.

The safety valves are in particular constructed to open, that is to say, to enable a throughflow, in the event of a throughflow below the predetermined maximum throughflow and/or in the event of a pressure difference below the predetermined maximum pressure difference. This can be used for normal functionality such as filling and removing gas.

According to respective embodiments, one, some or all of the safety valves is/are arranged on one of the pressure containers in each case. For example, the safety valves may be configured in an accordingly integrated manner.

According to respective embodiments, one, some or all of the safety valves is/are arranged in a connection line in each case. The safety valves can thereby be spaced apart from the pressure containers.

According to respective embodiments, one, some or all of the safety valves is/are configured to close only at one side in each case. The safety function can thereby be achieved in the corresponding direction in which a closing function is carried out. According to respective embodiments, one, some or all of the safety valves is/are configured to close at both sides in each case. The safety function can thereby be achieved at both sides.

One, some or all of the safety valves may, for example, be configured in such a manner that they behave in the same manner in both possible throughflow directions. However, the behavior may also be different depending on the direction, whereby, for example, specific circumstances and requirements can be taken into account. Thus, for example, the filling mass flow could flow in the first direction, but the removal mass flow could flow in the second direction. Typically, the maximum filling mass flow which occurs during normal operation is greater than the maximum removal mass flow so that the mass flow limit of the safety valve in the second direction can already close with significantly lower mass flows than in the first direction.

According to a preferred embodiment, a respective safety valve has a valve member, a valve seat and a pretensioning device in each case. The pretensioning device may in particular be constructed to keep the valve member spaced apart from the valve seat in a rest state so that fluid which is flowing through flows around it. In this instance, there may in particular be provision for the valve member from the maximum throughflow and/or from the maximum pressure difference to be pressed against the valve seat counter to the force of the pretensioning device.

This enables a simple embodiment which functions in a purely mechanical manner and which consequently requires no electronic or electrical activation or monitoring. Finally, the valve member can be activated by the fluid itself flowing through.

The pressure containers may be connected in particular in fluid terms in parallel and/or in series. Appropriate fluid connections can thereby be produced.

According to an embodiment, the safety valves may be embedded in liners of the pressure containers. A liner may in particular form a hollow member in which a fuel is stored. The liner may, for example, be produced from aluminum or steel or from the alloys thereof. Furthermore, the liner may be produced from a plastics material.

Similarly, however, it is also possible to configure a pressure container without any liner. As a result of embedding in a liner of the pressure container, a particularly high level of integration and simple production can be achieved.

Preferably, the safety valves are constructed to also enable a residual throughflow in the closed state. It is thereby possible, for example, after an inadvertent closing operation, to achieve an opening by reducing an excessively large pressure difference.

The safety valves may in particular also be constructed to open again after the closure when a value falls below an opening pressure difference. This enables automatic opening if, for example, a closure has occurred inadvertently or without the occurrence of any leakage, wherein particularly as a result of a residual throughflow which has already been mentioned, the pressure difference can be reduced below the opening pressure difference and consequently opening can be achieved.

The pressure container arrangement may in particular be in the form of a chain tank or it may be in the form of a pipe storage system, wherein the pressure containers are in the form of respective storage pipes. A pipe storage system is in this instance in principle referred to as a plurality of storage pipes which are connected to each other, wherein such storage pipes are typically rather thin in comparison with their length. Corresponding typical values are set out below. A chain tank is intended to be understood to be a specific configuration of a pipe storage system, wherein storage pipes and connection lines are continuous and preferably produced from only one material, whereby a series arrangement of the chambers may be produced. Chain tanks and pipe storage systems are considered to be free form tanks which can advantageously be adapted to installation spaces.

The pressure containers preferably have a respective length-to-diameter ratio having a value between 5 and 40 or between 7 and 25 or between 9 and 15. Such values have been found to be advantageous for typical applications, in particular since they can be readily adapted to complex installation spaces.

In other words, safety measures which bring the safety of the pressure container arrangement, for example, in the form of chain tanks and pipe stores, to a comparable level to that of conventional tanks are intended to be introduced. The basic principle in this instance is that the chain tanks and pipe stores comprise chambers which each store only a fraction of the energy which is stored in a large-volume conventional tank container. This applies both to the chemical energy which is stored in the form of hydrogen or another gas and in particular to compression energy. The compression energy is for ideal gases $p*V$. Since the nominal pressure is the same for all types of pressure container, the volume is thus decisive. If damage to a chamber substantially also enables only the gas of this chamber to be released, the risk with respect to damage to a large-volume tank is significantly reduced. For example, excess flow valves or safety valves should therefore be used between the individual tank chambers or pressure containers. In the event of damage to a chamber, as a result of the high mass flow or volume flow the excess flow valves or safety valves in the connections to the adjacent chambers are consequently closed. Consequently, practically only the hydrogen which is originally located in the damaged chamber or other gas can be discharged. The burst wave and the fire risk which are consequently produced as a result of the discharged hydrogen or other gas are thereby significantly reduced.

The excess flow valves or safety valves are preferably positioned in connections between the individual chambers or pressure containers. This has the advantage compared with positioning in the chamber that only a small cross section has to be closed at that location. More specifically, a valve seat may, for example, be located in such a manner that in the closed state it closes the smaller cross section, as is the case with the connections of the chambers. A portion of the valve could thus certainly come to rest in the chamber or in the dome region thereof.

In chain tanks, an introduction of excess flow valves or safety valves may preferably be carried out during the continuous production process, particularly preferably during a liner production. In pipe stores, the excess flow valves or safety valves may preferably be integrated in the connection between the chambers. The highest mass flows or volume flows, in which no closure of the excess flow valves or safety valves is intended to be carried out, are typically produced during the filling operation. If a circulation is used during the filling operation in order to prevent overheating in impasses, the resultant flows are thus also preferably taken into account.

The excess flow valves or safety valves are preferably configured and adjusted in such a manner that mass or volume flows which significantly exceed the above-described filling or recirculation flows lead to an actuation of the excess flow valves, that is to say, to a closure of the valve.

Preferably, there are used excess flow valves or safety valves which open again independently as soon as the pressure between the two sides, that is to say, upstream and downstream, has become balanced. Generally, this type of excess flow valve or safety valve also does not close completely but instead also enables in the closed state a slight leakage. This leads in the case of a system which is fluid-tight downstream to pressure equalization and thus enables the above-described independent opening. This is, for example, useful if the excess flow valve or safety valve has been activated by a briefly increased mass flow or throughflow but ultimately in an unauthorized manner.

The technology disclosed in this instance will now be explained with reference to the Figures.

DETAILED DESCRIPTION OF THE DRAWINGS

Figure 1:
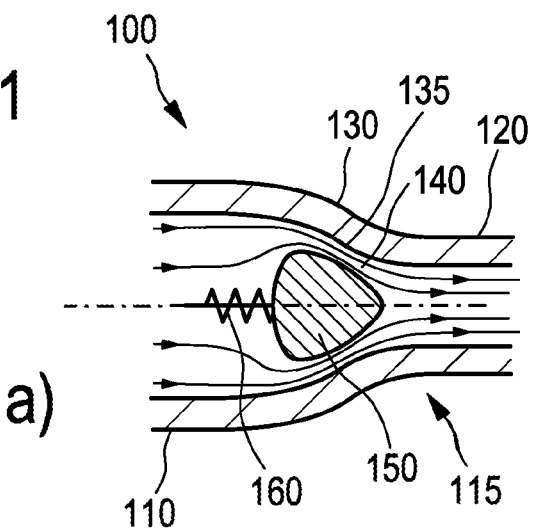
FIG. 1a is a cut-out of a pressure container arrangement.
FIG. 1b shows an associated circuit diagram.
Figure 1:
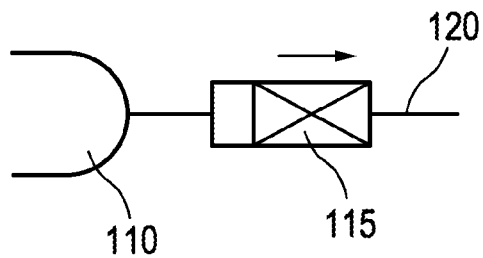

FIG. 1 shows a cut-out of a pressure container arrangement 100, that is, a transition between a pressure container 110 and an adjacent connection line 120. A tapering 130 is formed between the pressure container 110 and the connection line 120. There is formed therein a safety valve 115 which will be described in greater detail below.

The safety valve 115 has a valve member 150. This member is secured to a pretensioning device in the form of a spring 160 which enables a movement of the valve member 150 in a horizontal direction in the illustration of FIG. 1a and which pretensions it away from the tapering 130 toward the left. In this instance, a fluid flow which is illustrated using arrows flows around the valve member 150. This flow consequently flows in the illustration of FIG. 1a from left to right.

A compression 140 of the flow lines occurs between the valve member 150 and the tapering 130 and with a correspondingly larger pressure difference between the left side and right side of the safety valve 115 and/or with a correspondingly high throughflow leads to a reduced pressure which presses the valve member 150 to the right. The valve member 150 can then close the valve 115 so that the fluid flow which has been illustrated is no longer possible. The tapering 130 forms a valve seat 135 in this instance.

The safety valve 115 is consequently constructed in such a manner that, at a pressure difference below a predetermined maximum pressure difference and/or with a throughflow below a predetermined maximum throughflow, it is open and enables the corresponding throughflow, but closes when the predetermined maximum throughflow and/or the predetermined maximum pressure difference has been exceeded and consequently does not enable any further throughflow. This does not exclude a specific leakage from potentially even deliberately being enabled in order in the event of inadvertent closure to enable a reduction of the pressure difference and consequently to enable reopening of the safety valve 115.

FIG. 1b shows the pressure container 110 with the connection line 120 connected thereto and safety valve 115 contained therein as a circuit diagram. This illustration is used in the following Figures. The arrow over the safety valve 115 shows in this instance the direction in which a closure is possible as described. It can be referred to as the blocking direction.

Figure 2:
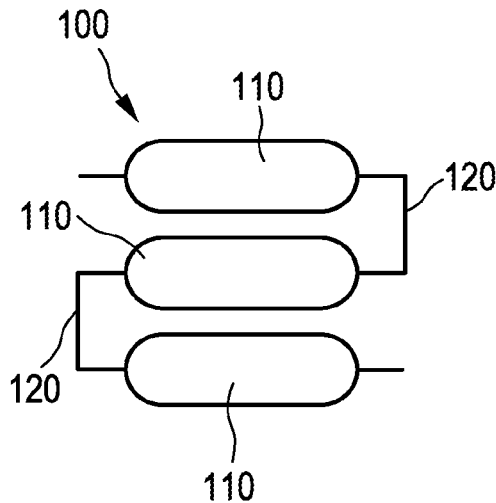
FIG. 2 shows a pressure container arrangement according to the prior art.

FIG. 2 shows a pressure container arrangement 100 according to the prior art. In this instance, a total of three pressure containers 110 are shown and are connected to each other by means of respective connection lines 120. It is evident that, in the event of a leakage occurring in one of the pressure containers 110, for example, as a result of mechanical damage, this would lead to direct emptying of all three pressure containers 110. This represents a safety problem since the gas which is discharged is typically flammable and is under high pressure.

Figure 3:
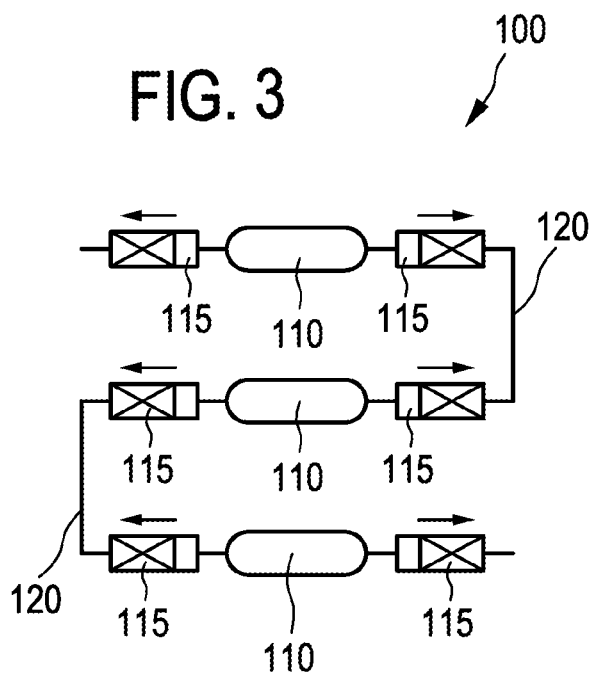
FIG. 3 shows a pressure container arrangement.

FIG. 3 shows a pressure container arrangement 100 according to an embodiment. In this instance, it can be seen that between the pressure containers 110 there are arranged in each case safety valves 115 which are constructed according to the illustration of FIG. 1a. They thus delimit the maximum throughflow and/or a maximum pressure difference. In the variant shown here, there are connected in each case between all the pressure containers 110 shown two safety valves 115 which have different blocking directions. By using two such safety valves 115 between the respective pressure containers 110, it is consequently possible for, in the event of a leakage from one of the pressure containers 110, only this pressure container 110 to be emptied, wherein, as a result of the high volume flows which immediately occur or high pressure differences which are applied, adjacent safety valves 155 close in each case and thus prevent the other pressure containers 110 from also being emptied. A corresponding occurrence of leakage or bursting consequently remains limited to one pressure container 110 and does not lead to an emptying of all pressure containers 110, as would be the case in the embodiment of FIG. 2.

Figure 4:
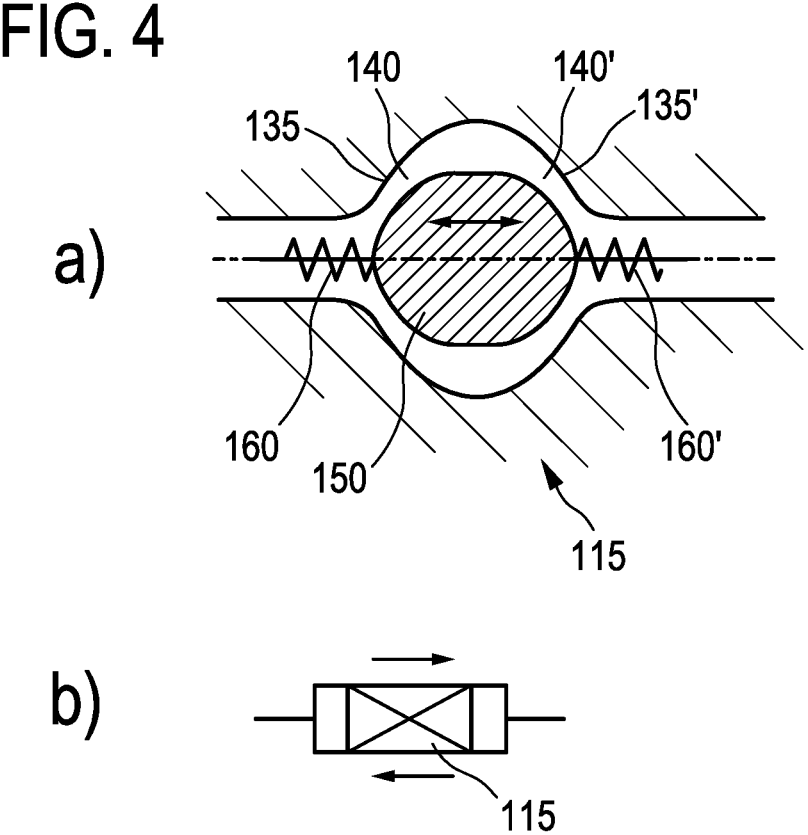
FIG. 4a shows a safety valve.
FIG. 4b shows an associated circuit diagram.

FIG. 4 shows an alternative embodiment of a safety valve 115, wherein in this instance the valve member 150 is pretensioned with two springs 160, 160' in both directions. Compressions 140, 140' of the flow lines may be formed in both directions so that with an excessively high throughflow or with an excessively high pressure difference in both directions a closure can be carried out in the respective direction. Accordingly, two valve seats 135, 135' are also formed. This may, for example, prevent two safety valves 115 being used between two pressure containers 110 in each case, as in FIG. 3. Nonetheless, the same safety functionality can be provided. A corresponding circuit diagram is shown in FIG. 4b. In this instance, there are illustrated two arrows which face in opposing directions and consequently indicate that the safety valve 115 has two blocking directions.

Figure 5:
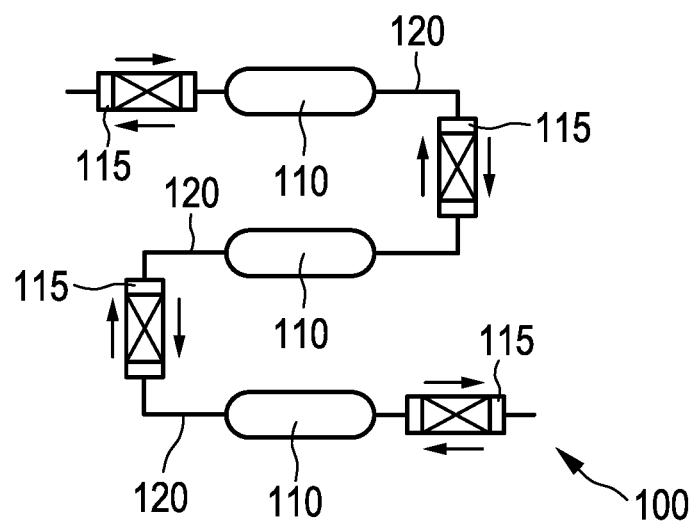
FIG. 5 shows a pressure container arrangement.

FIG. 5 shows a pressure container arrangement 100 according to another embodiment, wherein two pressure containers 110, between which only one safety valve 115 which closes at both sides according to the embodiment of FIG. 4*a* is provided, are also provided. The functionality is in this instance in principle identical to that of the embodiment of FIG. 3, but fewer safety valves 115 are required in total.

It should be mentioned that, in the embodiments of the safety valve shown, a respective retention member of the spring 160 and an axial guiding of the valve member 150 are not shown. Furthermore, it should be mentioned that the respective spring 160 can also be fitted differently, for example, in the embodiment of FIG. 1*a* at the other side. The same functionality can also be achieved as a result. The embodiment of FIG. 4*a* can also in principle be modified in such a manner that a single spring 160 is sufficient.

In the embodiment of FIG. 4*a*, it is possible, for example, by selecting the springs 160, 160' and as a result of geometric configurations of the flow direction, in particular of the respective tapering, to adjust for the different directions in such a manner that they close in the event of different throughflows and/or pressure differences. This may be advantageous since, for example, the filling can be carried out with a considerably higher mass flow or throughflow than the removal. The closure sensitivity can consequently be adapted in an optimum manner to such requirements.

Excess flow valves or safety valves can be integrated in pressure containers 110 in a particularly simple manner when a differential construction type is used. However, for example, it is also possible for an integration of the excess flow valves or safety valves to be carried out in an integral construction type which is economical in particular with high batch quantities. The tapering 130 which has already been mentioned can particularly be used to act as a valve seat 135 for the valve member 150.

What is claimed is:

1. A pressure container arrangement of a motor vehicle for storing pressurized fuel in a motor vehicle, comprising:
    a plurality of pressure containers;
    a number of safety valves; and
    a number of connection lines;
    wherein the plurality of pressure containers are connected in fluid terms by the number of connection lines;
    wherein at least one of the number of safety valves is disposed between a respective two of the plurality of pressure containers which are connected to each other in fluid terms by a respective connection line such that a fluid exits from a first one of the respective two of the plurality of pressure containers, enters into the respective connection line, and enters a second one of the respective two of the plurality of pressure containers from the respective connection line and wherein the at least one of the number of safety valves is disposed in the respective connection line that connects the respective two of the plurality of pressure containers to each other in fluid terms such that the fluid sequentially exits from the first one of the respective two of the plurality of pressure containers, then enters into the respective connection line, then passes through the at least one of the number of safety valves when the at least one of the number of safety valves is open, and then enters the second one of the respective two of the plurality of pressure containers from the respective connection line;
    wherein the number of safety valves are constructed to close from a predetermined maximum throughflow and/or from a predetermined maximum pressure difference.

2. The pressure container arrangement according to claim 1, wherein one, some, or all of the number of safety valves is/are configured to close only at one side of the respective safety valve.

3. The pressure container arrangement according to claim 1, wherein one, some, or all of the number of safety valves is/are configured to close at two sides of the respective safety valve.

4. The pressure container arrangement according to claim 1, wherein:
    each of the number of safety valves has a respective valve member, valve seat, and pretensioning device;
    the pretensioning device keeps the valve member spaced apart from the valve seat in a rest state such that fluid which is flowing through the safety valve flows around the valve member;
    the valve member from the predetermined maximum throughflow and/or from the predetermined maximum pressure difference is pressed against the valve seat counter to a force of the pretensioning device.

5. The pressure container arrangement according to claim 1, wherein the number of safety valves are constructed to enable a residual throughflow in a closed state.

6. The pressure container arrangement according to claim 1, wherein the number of safety valves are constructed to open after a closure when a value falls below an opening pressure difference.

7. The pressure container arrangement according to claim 1, wherein the pressure container arrangement is in a form of a chain tank.

8. The pressure container arrangement according to claim 1, wherein the pressure container arrangement is in a form of a pipe storage system and wherein the plurality of pressure containers are in a form of a respective storage pipe.

9. The pressure container arrangement according to claim 1, wherein the plurality of pressure containers have a respective length-to-diameter ratio having a value between 5 and 40 or between 7 and 25 or between 9 and 15.

* * * * *